United States Patent [19]
Minoura et al.

[11] 4,251,125
[45] Feb. 17, 1981

[54] SCANNING OPTICAL SYSTEM INCLUDING AN AFOCAL SYSTEM

[75] Inventors: Kazuo Minoura, Yokohama; Masaaki Ishii, Kawasaki, both of Japan

[73] Assignee: Canon Kabushiki Kaisha, Tokyo, Japan

[21] Appl. No.: 16,163

[22] Filed: Feb. 23, 1979

Related U.S. Application Data

[63] Continuation of Ser. No. 863,439, Dec. 22, 1977, abandoned.

[30] Foreign Application Priority Data

Dec. 28, 1976 [JP] Japan .................................. 51-159313
Feb. 4, 1977 [JP] Japan .................................. 52-11277

[51] Int. Cl.³ .............................................. G02B 27/17
[52] U.S. Cl. ........................................................ 350/6.5
[58] Field of Search ................................. 350/6.1–6.91

[56] References Cited

U.S. PATENT DOCUMENTS

| | | | |
|---|---|---|---|
| 2,692,369 | 10/1954 | Geiser | 350/6.6 |
| 2,844,648 | 7/1958 | Rosenthal | 350/6.8 |
| 3,687,025 | 8/1972 | Rosin | 350/6.91 |
| 3,771,850 | 11/1973 | Casler | 350/6.91 |
| 3,799,644 | 3/1974 | Street | 350/6.91 |

*Primary Examiner*—Jon W. Henry
*Attorney, Agent, or Firm*—Fitzpatrick, Cella, Harper & Scinto

[57] ABSTRACT

An optical system for scanning is disclosed which comprises an afocal optical system and a first - and a second deflecting members so disposed respectively at an optically conjugate position relative to the afocal optical system as to substantially interpose the system therebetween. The plane formed by a beam deflected by the first deflecting member is substantially coincident with that formed by a beam deflected by the second one. In order to control the angle of deviation (deflection) of the beam finally scanned, there is provided, for the afocal optical system, means for differentiating the exit angle from the incident angle of a beam passing through the afocal optical system. Furthermore, the angle of deflection of a beam deflected by the first deflecting member in a unit time period is made different from that deflected by the second one.

8 Claims, 5 Drawing Figures

SCANNING OPTICAL SYSTEM INCLUDING AN AFOCAL SYSTEM

This is a continuation of application Ser. No. 863,439 filed Dec. 22, 1977 now abandoned.

BACKGROUND OF THE INVENTION

The present invention relates to an optical system for scanning and more particularly to an optical system which is able to control the angle of field for scanning.

Hitherto, such type of optical system is known in which a beam for scanning is twice deflected in order that the angle of scanning field made by the first deflection may be different from that made by the second deflection. An example of such type of optical system is disclosed in U.S. Pat. No. 3,771,850.

In the scanning optical system disclosed in this patent specification, the first deflecting mirror is the same as the second one. More particularly, the scanning optical system is so designed that the beam deflected by the first deflecting mirror is directed to an afocal optical system and the deflected beam issued from it is reflected by a stationary mirror disposed in the vicinity of the focal plane of the rear lens group of the afocal optical system toward the latter. The deflected beam re-issued from the afocal optical system is again directed into the same first deflecting mirror.

This arrangement of scanning optical system does not allow control of the angle of deviation of the deflected beam finally obtained and the beam system.

SUMMARY OF THE INVENTION

Accordingly, it is an object of the present invention to provide a scanning optical system of the above mentioned type, namely of the type in which a beam for scanning is twice or more deflected, but which permits to control of the angle of deviation of the beam finally deflected as well as the diameter thereof.

It is another object of the invention to provide a scanning optical system which permits to control of the angle of deviation of the beam for scanning finally deflected and also in which the beam for scanning can scan a surface to be scanned at a uniform speed.

To attain the above and other objects according to the present invention, there is provided a scanning optical system comprising an afocal optical system having a focusing relation between object point and image point and two deflectors substantially interposing the afocal optical system therebetween. The two deflectors are so arranged that the deflection plane of the first deflector lies in the position of object point on the objective field side of the afocal optical system whereas that of the second deflector lies in the position of image point on the image field side and that the plane formed by the beam deflected by the first deflector substantially corresponds to that formed by the beam deflected by the second one.

According to one aspect of the present invention, the afocal optical system comprises means for differentiating the incident angle of a beam incident upon it from the exit angle of a beam emitted from it, by which the final angle of deviation of the deflected beam is controlled. Herein, the term "incident angle" means an angle which a beam incident on the afocal optical system makes to the optical axis of the system and the term "exit angle" should be understood as an angle which a beam emitted from the afocal optical system makes to the optical axis of the system.

According to another aspect of the invention, the angle of deviation of the deflected beam is controlled by making different the angles of deflection of beam for scanning deflected by the first and second deflectors in a unit time period from each other.

According to a further aspect of the invention, the angle of deviation of the deflected beam is controlled by making different the angles of deflection of the beam for scanning deflected by the first and second deflectors in a unit time period from each other, simultaneously with differentiating the incident angle of the beam incident upon the afocal optical system from the exit angle of the beam emitted from the same.

According to the present invention, it is also possible to control the angle of deviation of the deflected beam by suitably selecting the direction of rotation of the rotary shaft for each of the first and second deflectors.

In the scanning optical system according to the invention, the deflection angle of the beam deflected by the final deflector may be controlled as desired independently of the deflection angle of the beam deflected by the first deflector. Therefore, there is given a possibility of increasing or decreasing the angle of deviation of the deflected beam.

Furthermore, according to the invention, a uniform speed movement of the scanning beam on the surface to be scanned can be attained by giving a specific distortion characteristic to the lenses used in the scanning optical system.

Other and further objects, features and advantages of the invention will appear more fully from the following description taken in connection with the accompanying drawing.

DESCRIPTION OF THE PREFERRED EMBODIMENTS

Figure 1:
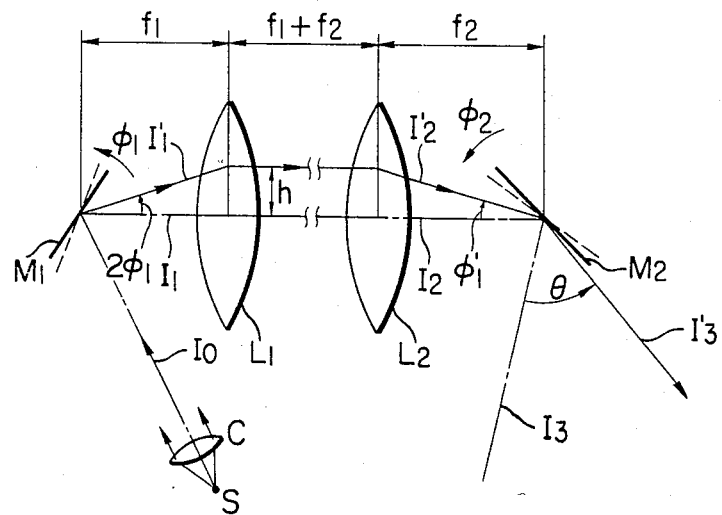
FIG. 1 is a schematic illustration for explaining the principle of the invention showing one embodiment of the scanning optical system according to the invention.

Referring now to FIG. 1 showing the first embodiment of the invention, the reference character S designates a light source and C is a collimator lens. Therefore, the beam $I_0$ incident onto the first deflecting mirror $M_1$ is a stationary parallel beam. $I_1$ designates a deflected beam produced from the first a control of the incident angle and the exit angle as described above, is composed, in this embodiment, of a front lens group $L_1$ and a rear lens group $L_2$. The above mentioned first mirror $M_1$ is positioned in the focal plane on the objective field side of the front lens group $L_1$. In the focal plane on the image field side of the rear lens group $L_2$, there is disposed a second deflecting mirror $M_2$. Accordingly, the deflected beam $I_2$ issued from the afocal optical system $L_1$, $L_2$ is further deflected by the second deflecting mirror $M_2$ to produce the deflected beam $I_3$. It is to be noted that the plane formed by the beam deflected by the first deflecting mirror is substantially equal to that formed by the beam deflected by the second one. In other words, the first and second mirrors $M_1$ and $M_2$ are so arranged that the rotary shaft of the first mirror is approximately in parallel with that of the second mirror and further that the beam incident upon the first deflecting mirror $M_1$ runs into the mirror along a plane normal to the axis of rotation of the mirror $M_1$.

Assumed that when the first deflecting mirror $M_1$ takes the position indicated by the solid line, the deflected beam $I'_1$ lies on the optical axis of the lenses $L_1$ and $L_2$, then by rotating the first mirror $M_1$ by $\phi 1$ namely up to the position indicated by the dotted line, the deflected beam $I'_1$ will have an angle of $2\phi 1$ relative to the optical axis. Then, assuming that the angle which the deflected beam $I'_2$ going to the second deflecting mirror $M_2$ from the lens $L_2$ forms to the optical axis is $\phi'1$ and the second deflecting mirror $M_2$ is rotated up to the position indicated by the solid line, that is, by the angle of $\phi 2$, then the angle formed between the deflected beam $I'_3$ and the optical axis will be represented by $2\phi 2 + \phi'1$.

Moreover, by setting the lenses $L_1$ and $L_2$ of the afocal optical system suitably, the $\phi 1$ can be represented by the angle of rotation $\phi 1$ of the first deflecting mirror $M_1$. The larger the focal length f1 of the lens $L_1$ is, compared with the focal length f2 of the lens $L_2$, the larger becomes the angle $\phi'1$ formed by the refracted beam $I'_2$ of the lens $L_2$ relative to the optical axis. Accordingly, a larger deflection angle $\theta$ can be obtained. But, in this instance, the diameter of the beam emitted from the lens $L_2$ is reduced in accordance with a relation formula established between the diameter and incident angle of the beam coming into the afocal optical system and the diameter and exit angle of the beam going out from the system. On the other hand, the smaller the focal length f1 of the lens $L_1$ is, compared with the focal length f2 of the lens $L_2$, the smaller the angle $\phi'1$ becomes. In this instance, the above mentioned diameter of the beam is reduced also in accordance with the relation formula mentioned above.

The deflection angle $\theta$ also can be controlled by the angle of rotation made by each of the deflecting mirrors $M_1$ and $M_2$ in a unit time period. Namely, the deflection angle $\theta$ may be controlled by differentiating the deflection angle of the beam deflected by the first deflecting mirror $M_1$ from that of the beam deflected by the second deflecting mirror $M_2$.

Furthermore, it is also possible to control the angle $\theta$ in dependence of whether the second deflecting mirror $M_2$ is rotated in the same direction or in the opposite direction to the direction of deflection of the beam incident on the mirror $M_2$ through the afocal optical system.

In case that the measure of differentiating the deflection angle given by one deflector from that give by another is adopted to control the angle of deviation (deflection) of the beam for scanning, each the deflector is so disposed that the scanning surface of each the deflector may correspond to it every scanning.

As will be understood from the foregoing, it is determined by the combination of various factors whether the angle of deviation $\theta$ of the beam finally deflected becomes larger or smaller than the angle of deflection $2\phi 1$ of the beam deflected by the first deflecting mirror $M_1$. Examples of such factor include the focal lengths f1 and f2 of the lenses ($L_1$, $L_2$) constituting the afocal optical system, the angles of deflection $\phi 1$ and $\phi 2$ made by the deflecting mirrors ($M_1$, $M_2$) in a unit time period respectively and the direction of rotation of each the deflecting mirrors ($M_1$, $M_2$).

Now, a detailed explanation will be made as to the deflection of a beam employing a scanning optical system as shown in FIG. 1 in which one deflecting means and another deflecting means are optically connected with each other by means of an afocal optical system and the focal plane on the objective field side of the afocal optical system lies on one deflecting means whereas the focal plane on the image field side lies on another deflecting means.

Generally, if the relation between the angle of rotation $\phi$ of a deflecting mirror as one deflecting means and time t is represented by the function of $\phi(t)$, then there is given the following equation for the angular velocity $\omega(t)$ of a light beam deflected relative to stationary incident light:

$$\omega(t) = 2 \frac{d\phi(t)}{dt} \tag{1}$$

As shown in FIG. 1, between the first and second deflecting mirrors $M_1$ and $M_2$ there are interposed lens $L_1$ having the focal length of f1 and lens $L_2$ of f2, and the two mirrors $M_1$ and $M_2$ with their rotation axes being in parallel with each other are rotated by $\phi 1$ and $\phi 2$ respectively for the incident beam $I_0$ so that the finally deflected beam $I'_3$ may be deflected by $\theta$. The beam $I'_1$ deflected by the mirror $M_1$ by $2\phi 1$ is directed to the lenses $L_1$ and $L_2$ by which the incident angle of the beam incident upon the second mirror $M_2$ is changed to $\phi'1$. Therefore, for the angle of deflection $\theta$, at this time there holds the following relation:

$$\theta = 2\phi 2 + \phi'1 \tag{2}$$

As the above $\phi'1$ is a function of $\phi 1$ which depends upon the focusing property of the afocal optical system ($L_1$, $L_2$), it is represented by:

$$\phi'1 = H(\phi 1) \tag{3}$$

wherein $H(\phi 1)$ is the function of the above mentioned focusing property.

The angle of rotation $\phi 1$ of the mirror $M_1$ and the angle of rotation $\phi 2$ of the mirror $M_2$ are functions of time t respectively, which can be represented by:

$$\begin{cases} \phi 1 = \phi 1(t) \\ \phi 2 = \phi 2(t) \end{cases} \tag{4}$$

Substituting these formula (3) and (4) in the formula (2) gives:

$$\theta = 2\phi 2(t) + H\{\phi 1(t)\} \tag{5}$$

So, the angular velocity $\omega(t)$ of the above mentioned deflected beam $I_3$ becomes:

$$\omega(t) = \frac{d\theta}{dt} = 2\frac{d\phi 2(t)}{dt} + \frac{dH}{d\phi 1} \cdot \frac{d\phi 1(t)}{dt} \tag{6}$$

It will be understood from the above formula (6) that compared with the case wherein a stationary beam is simply introduced into the mirror $M_2$, the above described arrangement of the optical system brings forth some change in angular velocity of the deflected beam $I'_3$. More particularly, by providing the mirror $M_1$ opposite to the mirror $M_2$ and rotatably or swing-movably in the same direction in the substantially same plane, and by interposing the afocal optical system $L_1$, $L_2$ between the mirrors $M_1$ and $M_2$ so as to introduce a beam to the mirror $M_2$ through the mirror $M_1$ and the afocal optical system $L_1$, $L_2$, the angular velocity of the deflected beam $I'_3$ is changed by $dH/d\phi1 \cdot d\phi1(t)/dt$. This means that in comparison with the case where a stationary beam is introduced to the mirror $M_2$, the angle of deviation $\theta$ of the beam $I'_3$ from the mirror $M_2$ is changed by an amount corresponding to the change $dH/d\phi1 \cdot d\phi1(t)/dt$ in angular velocity of the beam $I'_3$, by employing the above described arrangement of the mirror $M_1$ and the afocal optical system $L_1$ and $L_2$ and by introducing to the mirror $M_2$ the beam $I'_2$ moving in the opposite direction to that of rotation of the mirror $M_2$. In this case, when the condition $\theta > 2\phi1$ holds between the above mentioned angles $\theta$ and $\phi1$, the angle of deviation $\theta$ of the beam $I'_3$ finally deflected is increased by an increment corresponding to the angular velocity $dH/d\phi1 \cdot d\phi1/dt$ in comparison with the angle of $2\phi1$.

It is obvious that without the lenses $L_1$ and $L_2$ constituting an afocal optical system there is a possibility of making the angular velocity change. However, the use of the lens system $L_1$, $L_2$ brings forth particular advantages. Firstly, it permits a reduction in effective reflecting area of the mirror $M_2$. Secondly, it allows to give a certain characteristic to the angular velocity $\omega(t)$ by bringing the above described lens system characteristic function $H(\phi1)$ into relation with the deflecting property of the deflector(s).

Now, a consideration will be made for the case where a plural number of optical systems as illustrated in FIG. 1 are combined together. For example, considering that $(i+1)$ in number of deflectors are optically connected in series by $i$ in number of afocal optical systems in a manner as described above, then the following equation will be given:

$$\omega(t) = \frac{d\theta i+1}{dt} = 2\frac{d\phi i+1}{dt} + \frac{dHi}{d\theta i} \cdot \frac{d\theta i}{dt} \quad (7)$$

wherein, $\theta i+1$ is deflection angle of beam deflected finally i.e. by deflector of number $i+1$ through deflectors of number $1-i$;

$\omega(t)$ is angular velocity of beam finally deflected;

$\phi i+1$ is rotation angle of deflector of number $i+1$; and $Hi$ is characteristic function of lens system disposed between number $i$ and number $i+1$.

Referring now to FIGS. 2-5, some examples of optical system used for moving a beam spot condensed on a surface to be scanned at a constant speed are described. Each the example of optical system comprises two deflectors, an afocal optical system interposed therebetween and a condenser optical system disposed between the deflector and a surface to be scanned.

EXAMPLE 1

Figure 2:
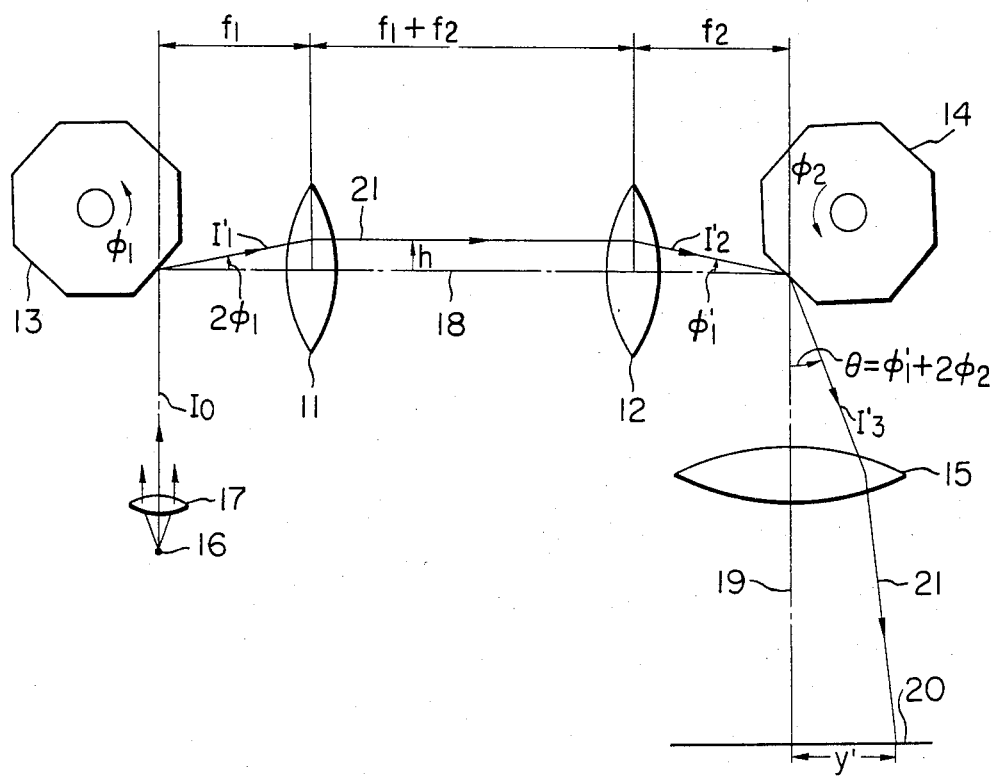
FIGS. 2, 3, 4 and 5 illustrate other embodiments of the invention respectively.

FIG. 2 illustrates a scanning optical system in which two deflectors are composed of two polygon mirrors rotatable in a uniform angular velocity. Lenses 11 and 12 constitute an afocal optical system. The focal length of the lens 11 is $f1$ and that of the lens 12 is $f2$. The distance on the optical axis between the two lenses is $f1+f2$. The distance between the first deflector 13 and the lens 11 is $f1$ and that between the second deflector 14 and the lens 12 is $f2$. The scanning beam emitted from a light source 16 is turned into a parallel beam by a collimator lens 17 and thereafter thrown to the first deflector 13.

Setting of this optical system is so made that when the scanning beam deflected by the first deflector 13 runs along the optical axis 18 of the afocal optical system, the scanning beam deflected by the second deflector 14 also runs along the optical axis 19 of a condenser optical system 15 and reaches a surface 20 to be scanned.

After rotating the first deflector by $\phi1$, and the second one by $\phi2$, the above described position where the beam for scanning runs on the optical axis (18, 19) is shifted to other position which is indicated by the scanning beam 21.

Provided that the lens used (11, 12) is an ordinary one having no distortion characteristic, that is, such lens that focuses a light beam incident at the angle of $\theta$ at a position $f \cdot \tan \theta$ high from the optical axis when the focal length of the lens is $f$, there is produced the following relation:

$$\phi1' = \arctan [f1/f2 \cdot \tan(2\phi1)] \quad (8)$$

wherein $2\phi1$ is angle which the optical axis 18 and the beam 21 form immediately after the latter is deflected by the first deflector and $\phi1'$ is angle which they form just before the scanning beam enters the second deflector.

As shown by the previous described formula (2), the angle $\theta$ which the optical axis 19 and the scanning beam 21 form immediately after the latter is deflected by the second deflector becomes:

$$\theta = 2\phi2 + \arctan [f1/f2 \tan(2\phi1)] \quad (9)$$

Calculating the angular velocity of the beam 21 deflected by the second deflector according to the formula (6) gives:

$$\omega(t) = \frac{d\theta}{dt} = 2\frac{d\phi2}{dt} + \frac{2 \cdot \frac{f1}{f2} \sec^2(2\phi1)}{1 + \left(\frac{f1}{f2} \cdot \tan(2\phi1)\right)^2} \cdot \frac{d\phi1}{dt} = 2[k2 + \frac{f1}{f2} k1 \cdot \frac{1}{1 + \left\{(\frac{f1}{f2})^2 - 1\right\} \sin^2(2\phi1)}] \quad (10)$$

$$\text{But,} \begin{cases} k1 = \frac{d\phi1(t)}{dt} \quad \text{(constant)} \\ k2 = \frac{d\phi2(t)}{dt} \quad \text{(constant)} \end{cases} \quad (11)$$

From the above formulae (9) and (10) it is clearly seen that the deflection angle $\theta$ is distinctly amplified and the angular velocity $\omega(t)$ also becomes higher.

By the condenser lens 15, a light spot is focused on the surface 20 to be scanned. If the distance between the light spot and the intersection of the scanning surface 20 with the optical axis 19 is represented by $y'$, the condition required to make the light spot move at a constant speed on the surface 20 is that $y'$ and the rotation angles ($\phi1, \phi2$) of deflectors should have a linear relation of:

$$y' = K1\phi1 - K2\phi2 \quad (12)$$

But, $$K1/K2 = k2/k1 \quad (13)$$

This is because the deflector shown in FIG. 2 is a polygon mirror and its angular speed of rotation is constant.

Provided that the focus position of the scanning beam is y'o when the condenser lens 15 used is generally of no distortion, the amount of distortion $\Delta y'$ of a condenser lens having a characteristic as shown by the above formula (12) becomes:

$$\Delta y' = y' - y'_o$$
$$= k_1\phi_1 - f_3 \cdot \tan\theta$$
$$= f_3 \left[ 2(\beta + m)\phi_1 - \frac{\tan(2m\phi_1) + \beta\tan(2\phi_1)}{1 - \beta\tan(2m\phi_1)\tan(2\phi_1)} \right] \quad (14)$$

But, $$\left. \begin{array}{l} f_3: \text{focal length of condensor lens 15} \\ K_1 = 2f_3(\beta + m) \\ \beta = f_1/f_2 \\ m = k_2/k_1 \end{array} \right\} \quad (15)$$

In summary, it is concluded that a constant scanning speed of condensed light spot on a surface to be scanned and a high speed scanning over a wide angle area as indicated by the formulae (9) and (10) are attainable in a scanning optical system as shown in FIG. 2 by using as lens system 15 such lens that has a distortion characteristic as indicated by the formula (14) provided that each the deflectors (13, 14) rotates at a uniform speed and that lenses 11 and 12 have a relation as indicated by the formula (8) therebetween.

EXAMPLE 2

There is another possibility of attaining a uniform speed scanning of a surface to be scanned (which surface is also referred to as scanning surface) in the arrangement of scanning system shown in FIG. 2. For this purpose, a so-called $f-\theta$ characteristic is given to lenses 11, 12 and 15.

A lens provided with a $f-\theta$ characteristic is defined as follows:

When the lens has a focal length of f and a light beam incident upon the lens has a incident angle of $\theta$, it focuses the beam at the height (h) of $h = f \cdot \theta$ above the optical axis in its focal plane and further the height (h) of focusing point is proportional to the incident angle $\theta$ of the beam.

Therefore, when the relation formula of distortion characteristic between the lenses 11 and 12 is:

$$f_1\phi_1 = f_2\phi_1' \quad (16)$$

and the distortion characteristic function of the lens 15 is:

$$y' = f_3\theta \quad (17),$$

the speed of a light spot becomes also constant which scans on the scanning surface 20 that is the focal plane of the condenser lens 15.

EXAMPLE 3

The arrangement of scanning optical system shown in FIG. 2 provides a further possibility for attaining a uniform speed scanning of the light spot over the scanning surface 20.

For this purpose, an ordinary lens is used for the condenser lens 15 and a particular distortion characteristic as will be described in the following items (i) and (ii) is given to either one of the lenses 11, 12 constituting an afocal optical system.

(i) The lens to which a particular distortion characteristic is given, is lens 11 and the other lens 12 and the condenser lens 15 are of ordinary type of $f \cdot \tan \theta$. In this case, the lens 11 should have the following distortion characteristic provided that a beam introduced into the lens 11 at an incident angle of $2\phi_1$ is focused in its focal plane at the height of h above the optical axis:

$$h = \frac{f_2 [2(\beta + m)\phi_1 - \tan(2m\phi_1)]}{1 + 2(\beta + m)\phi_1 \tan(2m\phi_1)} \quad (18)$$

wherein $\beta$ and m have the same meanings as in formula (15).

(ii) The lens to which a particular distortion characteristic is given is lens 12 and the other lens 11 and the condenser lens 15 are of ordinary type of $f \cdot \tan \theta$. In this case, the relation of distortion characteristic which the lens 12 should have, is:

$$\phi_1' = \arctan\left[ \frac{(\beta + m)\arctan(\frac{h}{f_3}) - \tan\left(m\arctan(\frac{h}{f_3})\right)}{1 + (\beta + m)\arctan(\frac{h}{f_3}) \cdot \tan\left(m\arctan(\frac{h}{f_3})\right)} \right] \quad (19)$$

EXAMPLE 4

In the above described Examples 1 through 3, there is used a rotary polygon mirror rotating at a uniform speed as deflector. This Example 4 uses another type of deflector as shown in FIG. 3.

Figure 3:
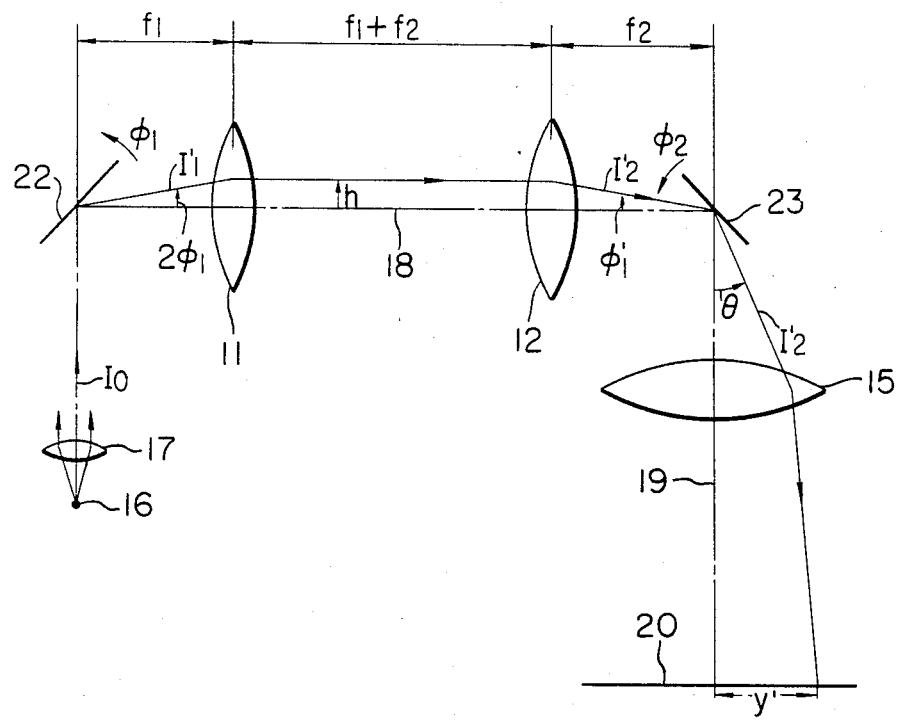

The deflectors 22 and 23 shown in FIG. 3 are galvanomirrors the rotation angle of which operates sinusoidally relation to time t.

The basic arrangement of the optical system of FIG. 3 is essentially same as that of FIG. 2 and only the difference therebetween resides in that the deflectors 22 and 23 used in the former are galvanomirrors which perform a sinusoidal oscillating motion. Indicating the respective oscillation angles of the deflectors 22, 23 with time t being its parameter becomes:

$$\left. \begin{array}{l} \phi_1(t) = a_1 \sin b_1 t \\ \phi_2(t) = a_2 \sin b_2 t \end{array} \right\} \quad (20)$$

wherein a1, a2, b1 and b2 are constants.

Provided that the lenses 11, 12 constituting an afocal optical system are ordinary $f \cdot \tan \theta$ lenses, the above formula (9) gives:

$$\theta = \arctan\left[ \frac{\tan\{2\phi_1(t)\} + \beta\tan\{2\phi_2(t)\}}{1 - \beta\tan\{2\phi_1(t)\}\tan\{2\phi_2(t)\}} \right] \quad (21)$$

So, if the focusing position on the condenser lens 15 has a relation of:

$$y' = \frac{2f_3[a_1b_1 + \beta a_2 b_2] \arcsin\frac{\phi_1(t)}{a_1}}{b_1} \quad (22),$$

then the scanning speed of condensed light spot on the focal plane becomes always constant.

In other words, in such a case where the deflectors (22, 23) are galvanomirrors the respective oscillations of which are given by the formula (20) and the two lenses 11 and 12 disposed between the deflectors (22, 23) are ordinary ones, the moving speed of the spot on the scanning surface is made constant by focusing the scanning beam deflected by the second deflector 23 according to the above formula (21), using a lens that has a distortion characteristic indicated by the above formula (22).

EXAMPLE 5

The arrangement of scanning optical system shown in FIG. 3 provides another possibility for making constant the moving speed of the light spot on the scanning surface 20 which lies on the focal plane of the condenser lens 15. For this purpose, a particular distortion characteristic is given to the lenses 11 and 12 constituting an afocal optical system and further also to the condenser lens 15.

In order to make the lenses (11, 12, 15) have respectively a specific distortion characteristic, there are adoptable the following two alternative measures (i) and (ii):

(i) The lens 11 is made to have such distortion characteristic as $$h = 2a1 f1 \text{ arc sin } \phi1/a1 \qquad (23),$$

the lens 12 is made to have such distortion characteristic as $$h = 2a1 f1 \text{ arc sin } \phi1'/2\beta a1 \qquad (24),$$

and the lens 15 is made to have such distortion characteristic as $$y' = 2(a2 + \beta a1) f3 \text{ arc sin } \frac{\theta}{2(a2 + \beta a1)} \qquad (25).$$

(ii) The lens 11 is made to have such distortion characteristic as $$h = f1 \phi1 \qquad (26),$$

the lens 12 is made to have such distortion characteristic as $$h = f2 \phi1' \qquad (27)$$

and the lens 15 is made to have such distortion characteristic as $$y' = 2(a2 + \beta a1) f3 \text{ arc sin } \frac{\theta}{2(a2 + \beta a1)} \qquad (28)$$

In this manner, it is allowed to make constant the moving speed of a condensed light spot on the remaining surface 20 even when those deflectors are used which sinusoidally oscillate as shown by the formula (20).

Here, it should be noted that in Examples 4 and 5 described above, the oscillation periods of the respective deflectors are all the same.

EXAMPLE 6

In the above described examples, Examples 1 through 5, explanation has been made particularly of the case where both of the two deflectors rotate at a uniform speed or oscillate sinusoidally. However, according to the present invention, it is also possible to attain a uniform speed movement of the condensed light spot on the focal plane of the condenser lens 15 even when one of the two deflectors rotate at a uniform speed and the other oscillates sinusoidally. For this purpose, it is required again to give a particular distortion characteristic to the lenses 11 and 12 and the condenser lens 15 respectively.

Figure 4:
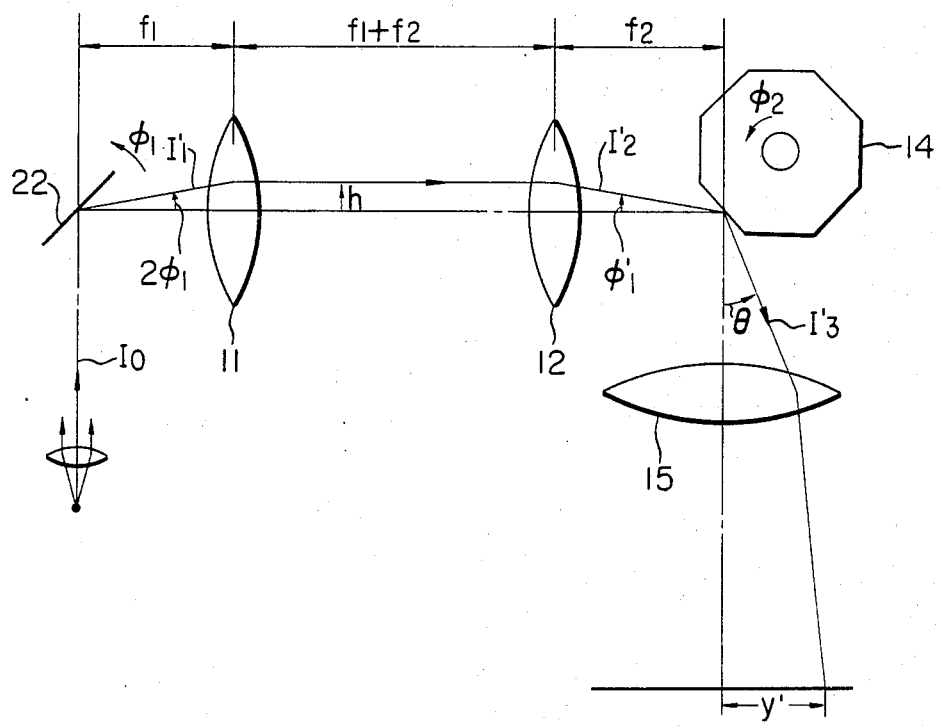
Figure 5:
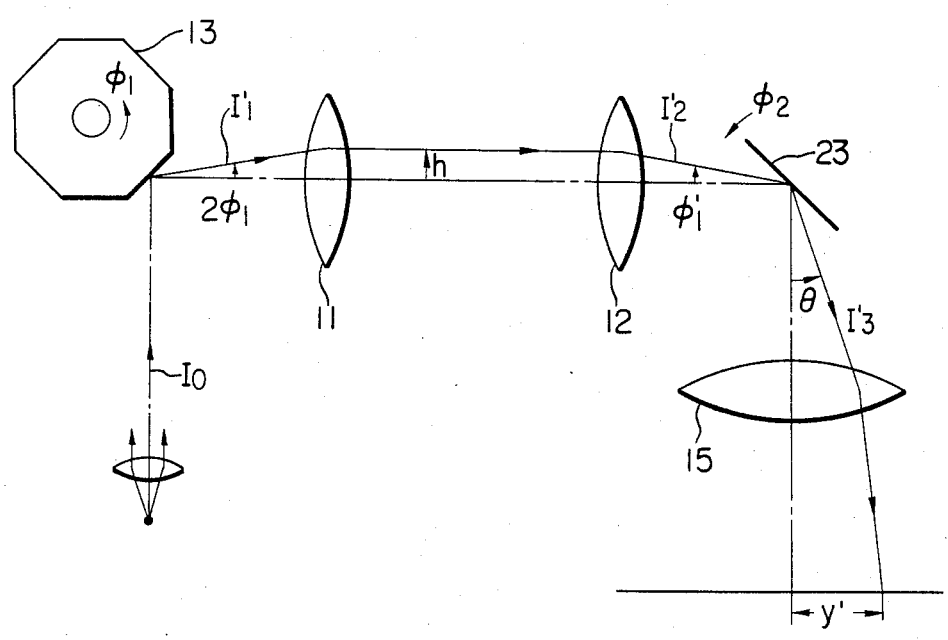

FIGS. 4 and 5 illustrate two examples of such scanning optical system comprising two deflectors that are different in type from each other. Except this feature of deflectors, the arrangement of the scanning optical systems shown in FIGS. 4 and 5 are essentially same as that of those shown in FIGS. 2 and 3. (i) FIG. 4 illustrates a scanning optical system in which the first deflector 22 is a galvanomirror that oscillates sinusoidally and second deflector 14 is a rotary polygon mirror that rotates at a uniform speed.

In this case, the lenses 11 and 12 and the condenser lens 15 are made to have the following distortion characteristics:

For the lens 11;

$$h = 2a1 f1 \text{ arc sin } \phi1/a1$$

for the lens 12;
$$h = f2\phi1'$$

and
for the condenser lens 15;

$$y' = f3\theta$$

(ii) FIG. 5 illustrates a similar scanning optical system in which the first deflector 13 is a rotary polygon mirror that rotates at a uniform speed and the second deflector 23 is a galvanomirror that oscillates sinusoidally.

In this case, the lenses 11 and 12 and the condenser lens 15 are made to have the following distortion characteristics:

For the lens 11;

$$h = f1 \phi1$$

for the lens 12;

$$h = 2k1 f1/b2 \text{ arc sin } b2\phi1'/2k1\beta$$

and
for the condenser lens 15;

$$y' = 2f3(a2 + \frac{k1\beta}{b2}) \text{ arc sin } \frac{\theta}{2(a2 \frac{k1\beta}{b2})}$$

While there has been described preferred forms of the present invention, obviously modifications and variations are possible in light of the above teachings. It is therefore to be understood that within the scope of the appended claims, the invention may be practiced otherwise than as specifically described.

What we claim is:
1. A scanning optical system comprising:
an afocal system including a first lens group having a focal length $f_1$ and a second lens group having a focal length $f_2$, which afocal optical system brings the object point on its objective field side and the image point on the image field side into an optically conjugate, positional relation;

a first deflecting member of the constant angular velocity type disposed in the vicinity of said object point on the objective field side of the afocal optical system to scan the beam;

a second deflecting member of the constant angular velocity type, disposed in the vicinity of said image point on the image field side of the optical system within a plane substantially equal to the plane formed by the beam scanned by said first deflecting member;

first optical means for directing a parallel beam to be incident on said first deflecting member;

second optical means for directing the beam coming from said second deflecting member to a surface to be scanned;

said first lens group and second lens group having no distortion, and said second optical means being an image forming lens with focal length of $f_3$ and the following characteristic;

$$\Delta y' = f_3[2(\beta + m)\phi_1 \frac{\tan(2m\phi_1) + \beta\tan(2\phi_1)}{1 - \beta\tan(2m\phi_1) \cdot \tan(2\phi_1)}].$$

where:

$\Delta$ is the distance between a position of a beam image formed on the surface to be scanned and a reference position at which the beam image would be formed if the image forming lens had no distortion;

$\beta = f_1/f_2$ $m = K_1/K_2$, where $K_1$ is an angular velocity of said first deflecting member, and $K_2$ is an angular velocity of said second deflecting member;

$\phi$ is a rotational angle of said first deflecting member.

2. A scanning optical system comprising:

an afocal system including a first lens group having a focal length $f_1$ and a second lens group having a focal length $f_2$, which afocal optical system brings the object point on its objective field side and the image point on the image field side into an optically conjugate, positional relation;

a first deflecting member, of the constant angular velocity type disposed in the vicinity of said object point on the objective field side of the afocal optical system to scan the beam;

a second deflecting member of the constant angular velocity type disposed in the vicinity of said image point on the image field side of the optical system within a plane substantially equal to the plane formed by the beam scanned by said first deflecting member;

first optical means for directing a parallel beam to be incident on said first deflecting member;

second optical means for directing the beam coming from said second deflecting member to a surface to be scanned; said second lens group and said second optical means having no distortion, and said first lens group having the following characteristic:

$$h = \frac{f_2[2(\beta + m)\phi_1 - \tan(2m\phi_1)]}{1 + 2(\beta + m)\phi_1 \tan(2m\phi_1)}$$

where:

h is the distance between the optical axis of said first lens group and a position on the focal plane thereof where an image of the beam incident thereon with an angle $2\theta$ is formed thereon, $\beta = f_1/f_2$ $m = K_1/K_2$ where $K_1$ is an angular velocity of the first deflecting member, $K_2$ is an angular velocity of the second deflecting member, and $\phi_1$ is a rotational angle of said first deflecting member.

3. A scanning optical system comprising:

an afocal system including a first lens group having a focal length $f_1$ and a second lens group having a focal length $f_2$, which afocal optical system brings the object point on its objective field side and the image point on the image field side into an optically conjugate, positional relation;

a first deflecting member of the constant angular velocity type disposed in the vicinity of said object point on the objective field side of the afocal optical system to scan the beam;

a second deflecting member of the constant angular velocity type disposed in the vicinity of said image point on the image field side of the optical system within a plane substantially equal to the plane formed by the beam scanned by said first deflecting member;

first optical means for directing a parallel beam to be incident on said first deflecting member;

second optical means for directing the beam coming from said second deflecting member to a surface to be scanned;

first lens group and second optical means having no distortion, and said second lens group having the following characteristic;

$$\phi_1' = \arctan \frac{[(\beta + m)\arctan(\frac{h}{f_3}) - \tan\{m \cdot \arctan(\frac{h}{f_3})\}]}{1 + (\beta + m)\arctan(\frac{h}{f_3})\tan\{m \cdot \arctan(\frac{h}{f_3})\}}$$

where $\phi_1'$ is an angle of the beam emergent from said second lens group with respect to its optical axis, $\beta = f_1/f_2$, $f_3$ is a focal length of said second optical means, $m = K_2/K_1$ where $K_1$ is an angular velocity of the first deflecting member, $K_2$ is an angular velocity of the second deflecting member, and h is a distance between the optical axis of said first lens group and a position on the focal plane thereof where an image of the beam is formed thereon.

4. A scanning optical system comprising:

an afocal system including a first lens group having a focal length $f_1$ and a second lens group having a focal length $f_2$, which afocal optical system brings the object point on its objective field side and the image point on the image field side into an optionally conjugate, positional relation;

a first deflecting means, disposed in the vicinity of said object point on the objective field side of the afocal optical system to scan the beam, including a galvanomirror whose rotational angle $\phi$ is represented by $\phi_1 = a_1 \sin b_1 t$, where t is time and $a_1$, $b_1$ are constants;

a second deflecting member, disposed in the vicinity of said image field side of the optical system within a plane substantially equal to the plane formed by the beam scanned by said first deflecting member, including a falvanomirror whose rotational angle $\phi_2$ is represented by $\phi_2 = a_2 \sin b_2 t$, where t is time and $a_2$, $b_2$ are constants;

said first and second groups having no distortion, and said second optical means being an image forming lens having a focal $f_3$ with the following characteristic;

$$y' = \frac{2f_3[a_1b_1 + \beta a_2b_2] \arc \tan(\frac{2\phi_1}{a_1})}{b_1}$$

where $y'$ is a distance between the optical axis of said second optical means and a position on the focal plane thereof where an image of the beam is formed thereon and $\beta = f_1/f_2$.

5. A scanning optical system comprising:

an afocal system including a first lens group having a focal length $f_1$ and a second lens group having a focal length $f_2$, which afocal optical system brings the object point on its objective field side and the image point on the image field side into an optically conjugate, positional relation;

a first deflecting member, disposed in the vicinity of said object point on the objective field side of the afocal optical system to scan the beam, including a galvanomirror whose rotational angle $\phi_1$ is represented by $\phi_1 = a_1 \sin b_1 t$, where it is time and $a_1$, $b_1$ are constants;

a second deflecting member, disposed in the vicinity of said image field side of the optical system within a plane substantially equal to the plane formed by the beam scanned by said first deflecting member, including a galvanomirror whose rotational angle $\phi_2$ is represented by $\phi_2 = a_2 \sin b_2 t$, where t is time and $a_2$, $b_2$ are constants;

said first lens group having the following characteristic;

$h = 2a_1f_1 \arc \sin \phi_1/(a_1)$ said second lens group having the following distortion:

$h = 2a_1f_1 \arc \sin \phi_1/(2\beta a_1)$ said second optical means being an image forming lens having a focal length $f_3$ with the following distortion:

$y' = 2(a_2 + \beta a_1)f_3 \cdot \arc \sin \theta/[2(a_2 + \beta a_1)]$ where
$\beta = f_1/f_2$ h is a distance between the optical axis of said first lens group and a position on the focal plane thereof where an image of the beam incident on said first lens group with an angle of $2\phi_1$, is formed thereon, $\phi_1$ is an angle formed between the optical axis of said second lens group and the beam emergent therefrom, which beam has been incident on said first lens group with the angle of $2\phi_1$, $\phi$ is an angle formed between the optical axis of said second optical means and the beam incident thereon, and $y'$ is a distance between the optical axis of said second optical means and a position on the focal plane thereof where an image of the beam is formed thereon.

6. A scanning optical system comprising:

an afocal system including a first lens group having a focal length $f_1$ and a second lens group having a focal length $f_2$, which afocal optical system brings the object point on its objective field side and the image point on the image field side into an optically conjugate, positional relation;

a first deflecting member, disposed in the vicinity of said object point on the objective field side of the afocal optical system to scan the beam, including a glavanomirror whose rotational angle $\phi_1$ is represented by $\phi_1 = a_1 \sin b_1 t$, where t is time and $a_1$, $b_1$ are constants;

a second deflecting member, disposed in the vicinity of said image field side of the optical system within a plane substantially equal to the plane formed by the beam scanned by said first deflecting member, including a galvanomirror whose rotational angle $\phi_2$ is represented by $\phi_2 = a_2 \sin b_2 t$, where t is time and $a_2$, $b_2$ are constants;

said first and second groups having $f-\theta$ characteristics of distortion, and said second optical means having a focal length $f_3$ with the following characteristics;

$y' = 2(a_2 + \beta a_1)f_3 \cdot \arc \sin \theta/2(a_2 + \beta a_1)$ where
$\beta = f_1/f_2$, $\theta$ is an angle formed between the optical axis of said second optical means and the beam incident thereon, $y'$ is a distance between the optical axis of said second optical means and a position on the focal plane thereof where an image of the beam is formed thereon, and where $f-\theta$ characteristics of distortion is such that an inclination of an afocal beam incident on a lens system plane, between the optical axis of the lens system and the image of the beam thereon.

7. A scanning optical system comprising:

an afocal system including a first lens group having a focal length $f_1$ and a second lens group having a focal length $f_2$, which focal optical system brings the object point on its objective field side and the image point on the image field side into an optically conjugate, positional relation;

a first deflecting member, disposed in the vicinity of said object point on the objective field side of the afocal optical system to scan the beam, including a galvanomirror whose rotational angle $\theta_1$ is represented by $\theta_1 = a_1 \sin b_1 t$, where $t_1$ is time and $a_1$ and $b_1$ are constants;

a second deflecting member, which is a constant angular velocity type, disposed in the vicinity of said image point on the image field side of the optical system within a plane substantially equal to the plane formed by the beam scanned by said first deflecting member;

said first lens group having the following characteristic:

$h = 2a_1f_1 \arc \sin \phi_1/(a_1)$ and said second lens group and said second optical means having f−θ characteristics of distortion, where h is a distance between the optical axis of said first lens group and a position on the focal plane thereof where an image of the beam incident on said first lens group with an angle of $2\phi_1$ is formed thereon, and where f−θ characteristics of distortion is such that an inclination of an afocal beam incident on a lens system is linear with respect to a distance, measured on its focus plane, between the optical axis of the lens system and the image of the beam thereon.

8. A scanning optical system comprising:

an afocal system including a first lens group having a focal length $f_1$ and a second lens group having a focal length $f_2$, which afocal optical system brings the object point on its objective field side and the image point on the image field side into an optically conjugate, positional relation;

a first deflecting member of the constant angular velocity type, disposed in the vicinity of said object point on the objective field side of the afocal optical system to scan the beam;

a second deflecting member, disposed in the vicinity of said image field side of the optical system within a plane substantially equal to the plane formed by the beam scanned by said first deflecting member, including a galvanomirror whose rotational angle $\phi_2$ is represented by $\phi_2 = a_2 \sin b_2 t$, where t is time and $a_2$ and $b_2$ are constants;

said first lens group having f−θ characteristics of distortion, and said second lens group having the following distortion;

$$h = \frac{2K_1 f_1}{b_1} \arcsin\left(\frac{b_2 \phi_1'}{2K_1 \beta}\right)$$

said second optical means being an image forming lens having a focal length $f_3$ with the following characteristic:

$$y' = 2f_3\left(a_2 + \frac{K_1}{b_2}\right) \arcsin\left[\frac{\theta}{2\left(a_2 + \frac{K_1 \beta}{b_2}\right)}\right]$$

where
$\beta = f_1/f_2$,
$K_1$ is an angular velocity of said first deflecting member,
h is a distance between the optical axis of said first lens group and a position on the focal plane thereof where an image of the beam incident on said first lens group with an angle of $2\phi_1$, is formed thereon,
$\theta$ is a distance between the optical axis of said second optical means and the beam incident thereon,
$y'$ is a distance between the optical axis of the second optical means and a position on the focal plane thereof where an image on the beam is formed thereon.

* * * * *

UNITED STATES PATENT AND TRADEMARK OFFICE
CERTIFICATE OF CORRECTION

PATENT NO. : 4,251,125
DATED : February 17, 1981
INVENTOR(S) : KAZUO MINOURA, ET AL.

It is certified that error appears in the above—identified patent and that said Letters Patent is hereby corrected as shown below:

Column 3, line 25, "$\theta$" should read --$\textcircled{H}$--
Column 3, line 37, "$\theta$" should read --$\textcircled{H}$--
Column 3, line 40, "$\theta$" should read --$\textcircled{H}$--
Column 3, line 44, "$\theta$" should read --$\textcircled{H}$--
Column 3, line 51, "give" should read --given--
Column 3, line 58, "$\theta$" should read --$\textcircled{H}$--
Column 4, line 24, "$\theta$" should read --$\textcircled{H}$--
Column 4, line 28, "$\theta$" should read --$\textcircled{H}$--
Column 4, line 31, "$\theta$" should read --$\textcircled{H}$--
Column 4, line 50, "formula" should read --formulae--
Column 5, line 34, "(i + 1)" should read --(1+1)
Column 8, line 47, before "1", add --$\emptyset$--
Column 8, line 49, before "2" insert --$\emptyset$--

UNITED STATES PATENT AND TRADEMARK OFFICE
CERTIFICATE OF CORRECTION

PATENT NO. : 4,251,125
DATED : February 17, 1981
INVENTOR(S) : KAZUO MINOURA, ET AL.

It is certified that error appears in the above—identified patent and that said Letters Patent is hereby corrected as shown below:

IN THE CLAIMS

Column 12, line 57, --"optionally" should be --optically-- ;

Column 12, line 59, "means" should be --member-- ; and

Column 13, line 1, "falvano" should read --galvano--

Signed and Sealed this

Eighteenth Day of August 1981

[SEAL]

Attest:

GERALD J. MOSSINGHOFF

Attesting Officer         Commissioner of Patents and Trademarks